Figure 9:
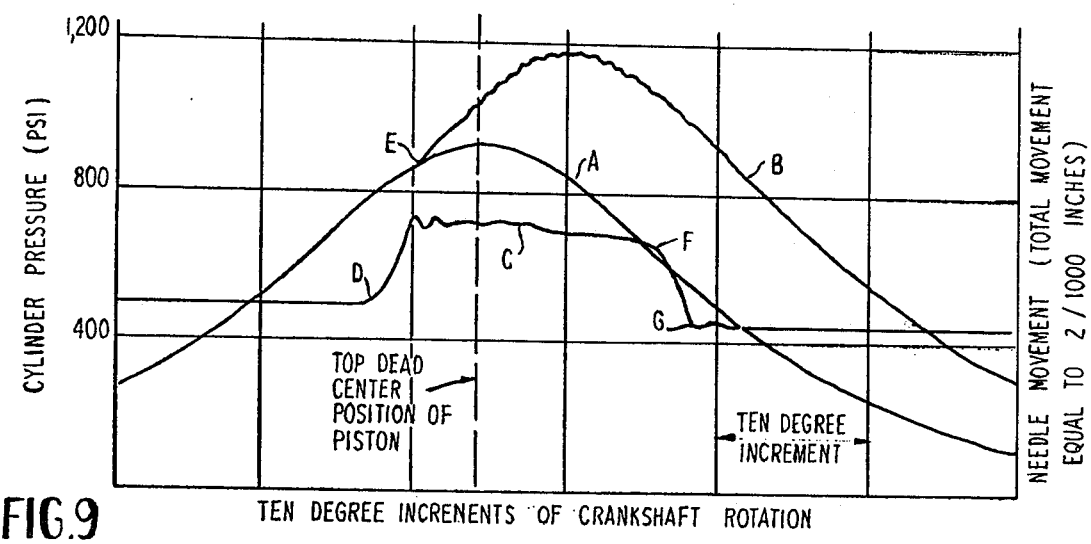

United States Patent [19]
Kruckenberg et al.

[11] 3,963,001
[45] June 15, 1976

[54] COMBUSTION SYSTEM FOR INTERNAL COMBUSTION ENGINES

[75] Inventors: Perry Lester Kruckenberg, Los Angeles; Harld Elden Anderson, Redondo Beach; Ray Lavette Carlson, Lake San Marcos, all of Calif.

[73] Assignee: McCulloch Corporation, Los Angeles, Calif.

[22] Filed: Dec. 8, 1972

[21] Appl. No.: 313,528

Related U.S. Application Data

[63] Continuation of Ser. No. 93,269, Nov. 27, 1970, abandoned, and a continuation-in-part of Ser. No. 739,434, June 24, 1968, Pat. No. 3,543,735.

[52] U.S. Cl. .............. 123/32 D; 123/32 B; 123/32 CY
[51] Int. Cl.² .................. F02B 19/16; F02B 3/00
[58] Field of Search ............. 123/32 B, 32 C, 32 D, 123/33 VC, 30 A, 32 CY

[56] References Cited
UNITED STATES PATENTS

| | | | |
|---|---|---|---|
| 1,450,567 | 4/1923 | Tartrais | 123/32 D |
| 1,605,000 | 5/1925 | Schneider | 123/32 B |
| 2,012,086 | 3/1929 | Mock | 123/32 B |
| 2,561,628 | 4/1956 | Kogel | 123/32 B |
| 3,386,422 | 2/1964 | Eyzat | 123/32 B |

*Primary Examiner*—Charles J. Myhre
*Assistant Examiner*—Ronald B. Cox
*Attorney, Agent, or Firm*—Burns, Doane, Swecker & Mathis

[57] ABSTRACT

Method and apparatus for burning fuel in internal combustion engines. A series of mutually distinct burning loci are created. Heated gas streams and fuel streams flow into these burning loci. Substantially all, or at least most, of the fuel is injected during the down stroke of the engine piston.

16 Claims, 18 Drawing Figures

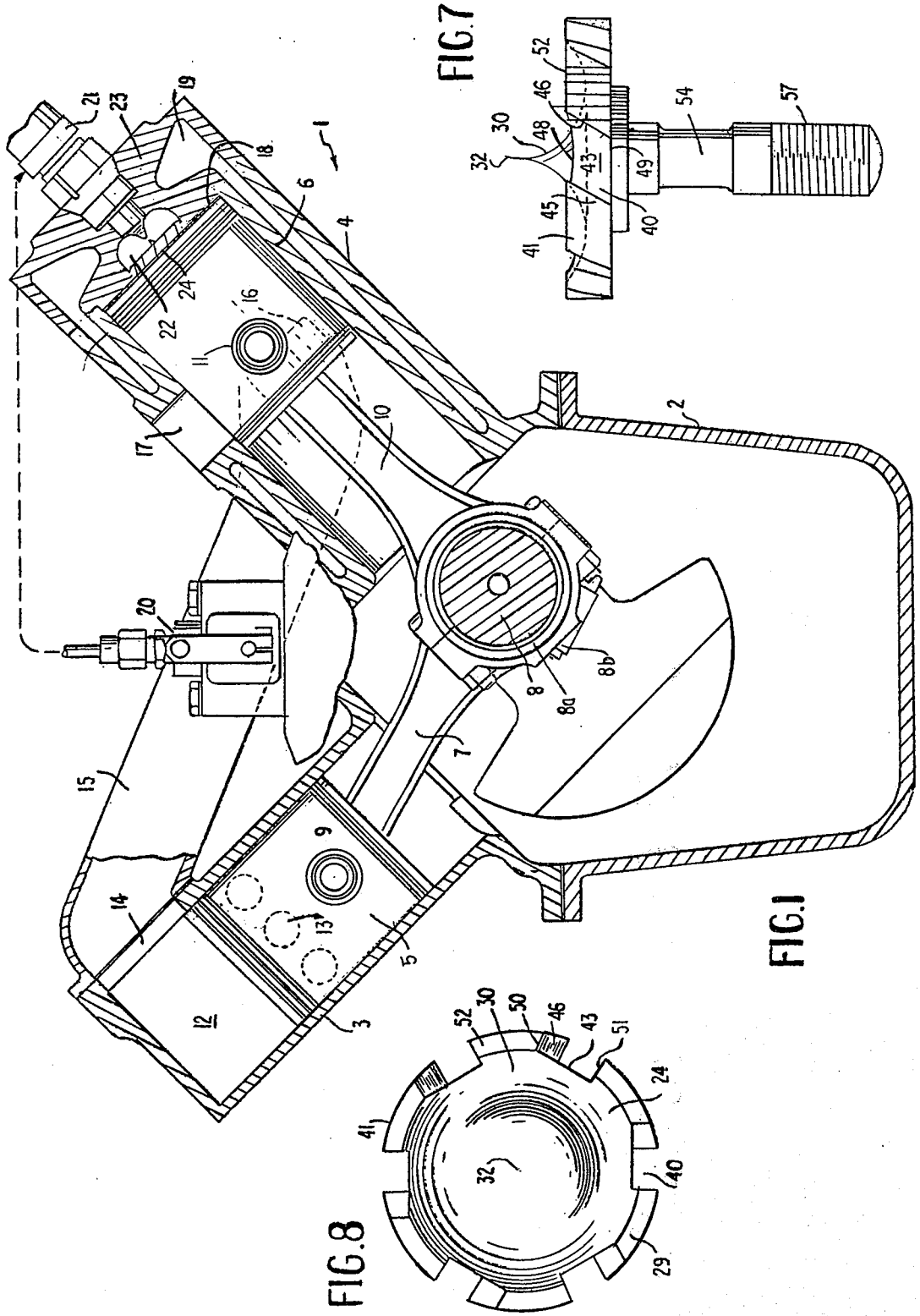

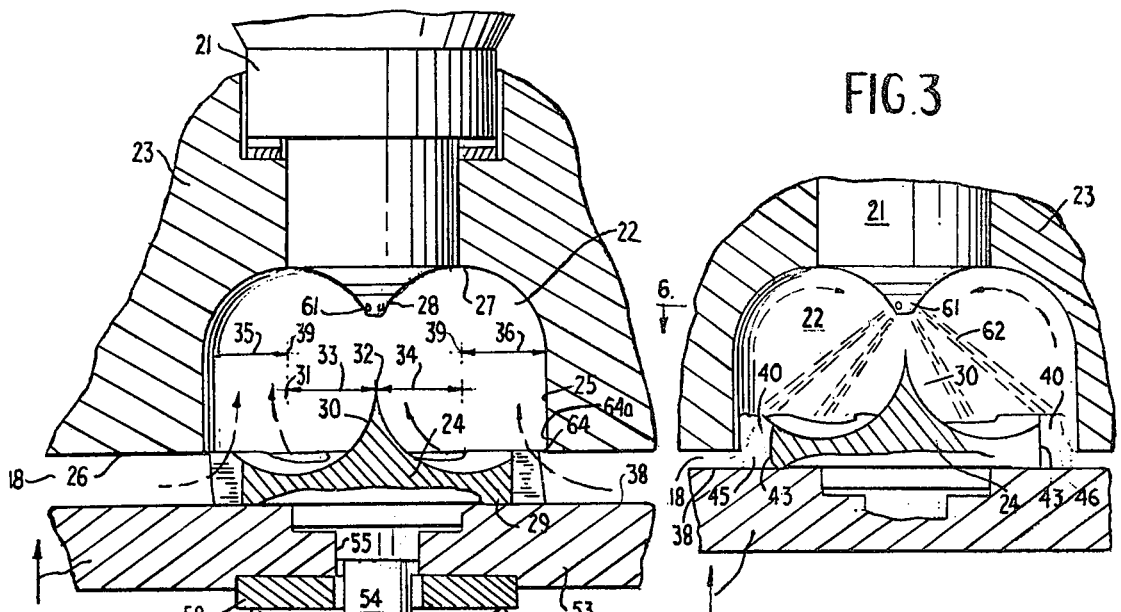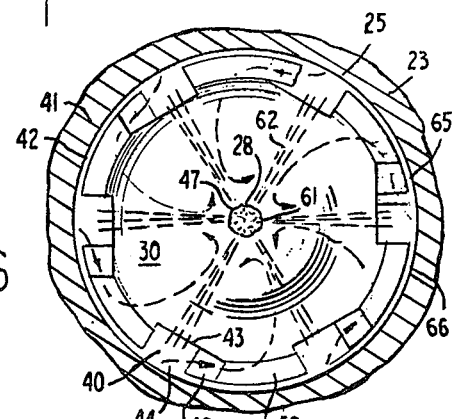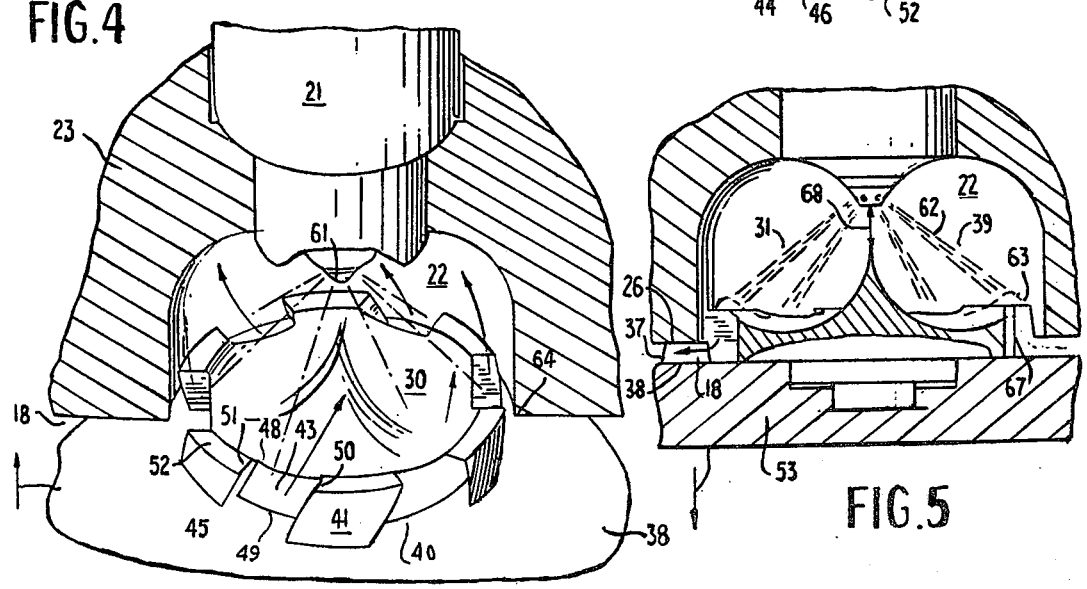

COMBUSTION SYSTEM FOR INTERNAL COMBUSTION ENGINES

RELATED APPLICATION

This is a continuation of application Ser. No. 93,269, filed Nov. 27, 1970, now abandoned.

This application is a continuation-in-part of application Serial No. 739,434, filed June 24, 1968, now U.S. Pat. No. 3,543,735 entitled "Improved Combustion System for Internal Combustion Engine" and assigned to the assignee of this present application.

GENERAL BACKGROUND, OBJECTS AND SUMMARY OF INVENTION

The internal combustion engine art has evolved continuously toward the goal of producing more efficient combustion, quieter engines, lower exhaust temperatures, improved ease of starting, and the ability to handle a wide range of fuel characteristics.

These optimum goals notwithstanding, and in spite of an almost endless variety of structural arrangements designed hopefully to attain these improvements, the ultimate goals, by and large, have remained elusive.

In recognition of the need for a fresh approach directed to the attainment of these goals, it is an object of the invention to provide improved apparatus and methods for burning fuel in internal combustion engines, which apparatus and methods promote more even combustion so as to improve the efficiency of, and control over, fuel burning, improve ease of engine starting, and facilitate the ability of engines to accommodate diverse fuels.

A principal object of the invention is to provide a uniquely intensified system for disrupting, heating, and burning fuel and which system is characterized by the generation of burning loci in an engine.

In the context of this basic object, it is contemplated that heated gas streams and fuel streams will pass into such burning loci so as to promote the heating, particulation, and combustion of the liquid fuel in the fuel streams.

It is likewise an object of the invention to implement the foregoing objects with fuel being injected, at least in major part, after a piston has reached top dead center, i.e. after the point in time when the piston has commenced its working stroke.

An object of an independent aspect of the invention is to cause the mass flow rate of fuel flowing into burning loci to bear a desired, generally continuing, relationship to the mass flow rate of combustion supporting gas passing into such burning loci. It is believed that optimum combustion results in an engine may be achieved where the mass flow rate of fuel, injected into a combustion chamber in the form of streams, is continuously increased during the working stroke of the piston and is maintained in, or tends to approach, a generally continuous ratio relationship to the mass flow rate of combustion supporting gas passing into the burning loci.

Yet another object of the invention is to implement the foregoing objects in the context of engines where the burning loci are controlled and located by path, passage, or slot defining wall means carried either by a piston or cylinder or cooperatively formed by interaction between a piston and cylinder.

It is a related object of the invention to provide such methods and apparatus which, in producing more even burning, minimize or eliminate detonation tendencies so as to maintain lower peak pressures within the combustion zone thereby reducing the possibility of mechanical damage lowering the level of engine noise, and lessening the need for heavy engine frame structures.

It is a particular object of the invention to provide a uniquely effective system for utilizing air, which has been compressed and heated by a piston, to disperse and heat fuel being injected into a combustion chamber during the downstroke of the piston.

A further object of the invention is to provide an improved system for dispersing and burning fuel in the cylinder of an internal combustion engine so as to substantially reduce carbonization and thereby lower the operating temperature of the engine and the engine exhaust.

In accomplishing certain of the foregoing objects, a method of burning fuel in an engine is presented which is characterized by the generation of generally mutually distinct, burning loci within the engine. Heat airstreams and fuel streams pass into these burning loci. The burning loci, at least in major part, are generated and maintained during the working stroke of an engine piston. Thus, the fuel streams are injected into the engine interior for combustion purposes in large part during the working stroke of the engine, i.e. for example, after a linearly reciprocating piston has reached "top dead center" and commenced its downstroke. During most of the fuel injection phase, the heated airstreams passing into the burning loci are heated, at least in part as a result of prior fuel combustion.

In another independent aspect of the invention, and/or in the context of the foregoing concept, the mass flow rate of fuel injected into the particular burning loci is relatively gradually increased in general proportion to the increasing rate of mass flow of combustion supporting gas into the burning loci, at least during the bulk of the period of time that the burning loci persists.

It will be recognized that the burning loci will be generated by wall means carried by a cylinder or by a piston or by cooperating wall means carried in part by a cylinder and in part by a piston.

Other independently significant facets of the invention entail apparatus means operable to accomplish the above-described combustion techniques.

DRAWINGS

In describing the invention, reference will be made to a preferred embodiment shown in the appended drawings.

Figure 10:
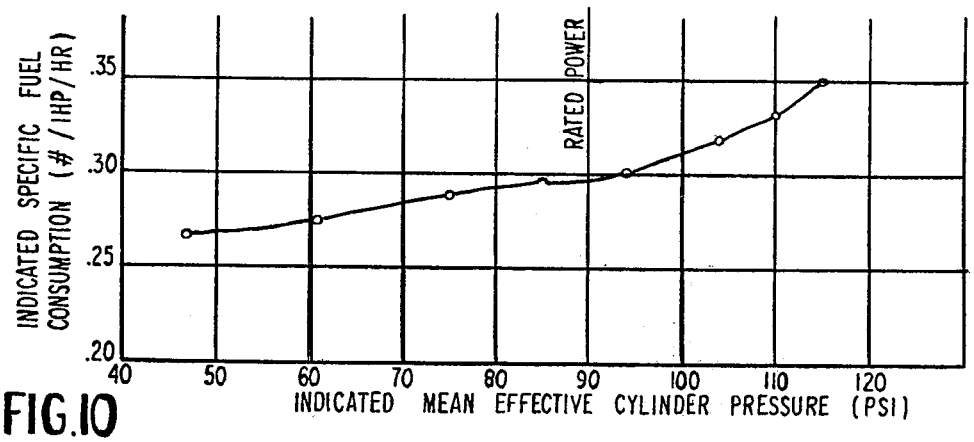
Figure 11:
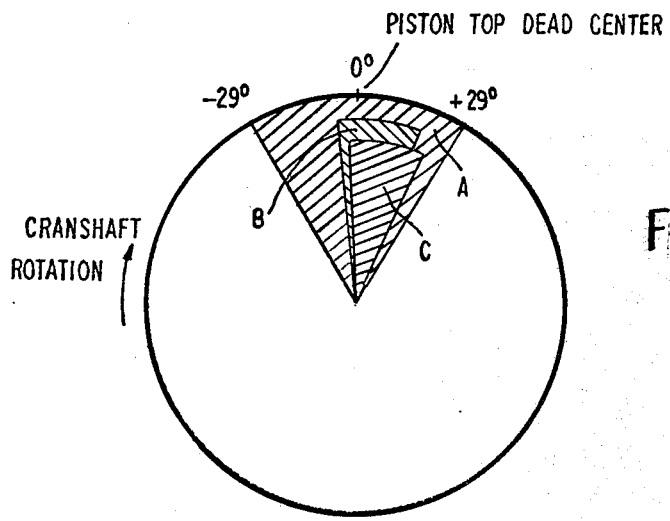
Figure 12:
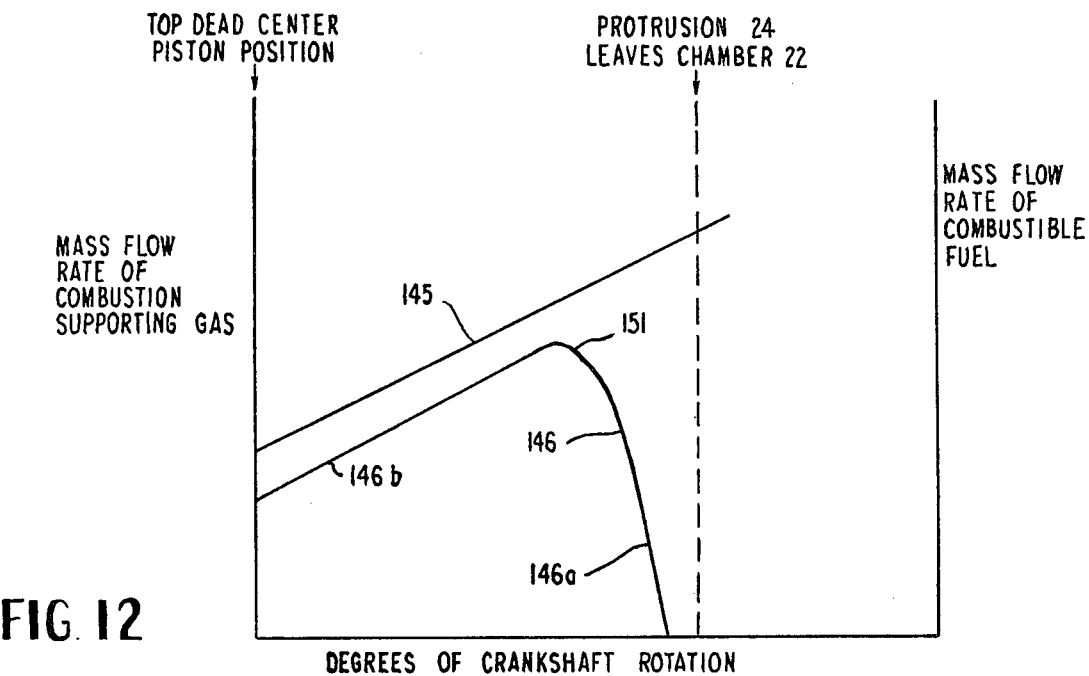
Figure 13:
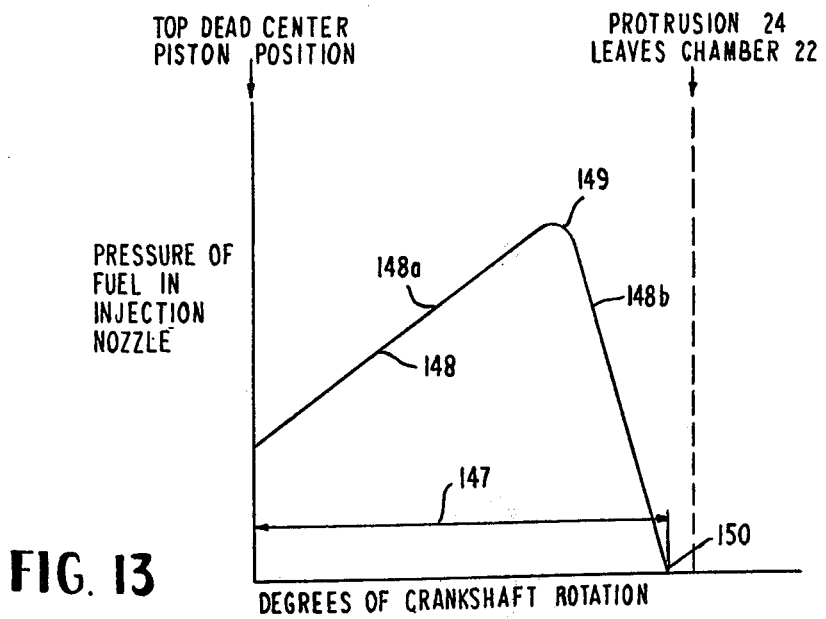
Figure 14:
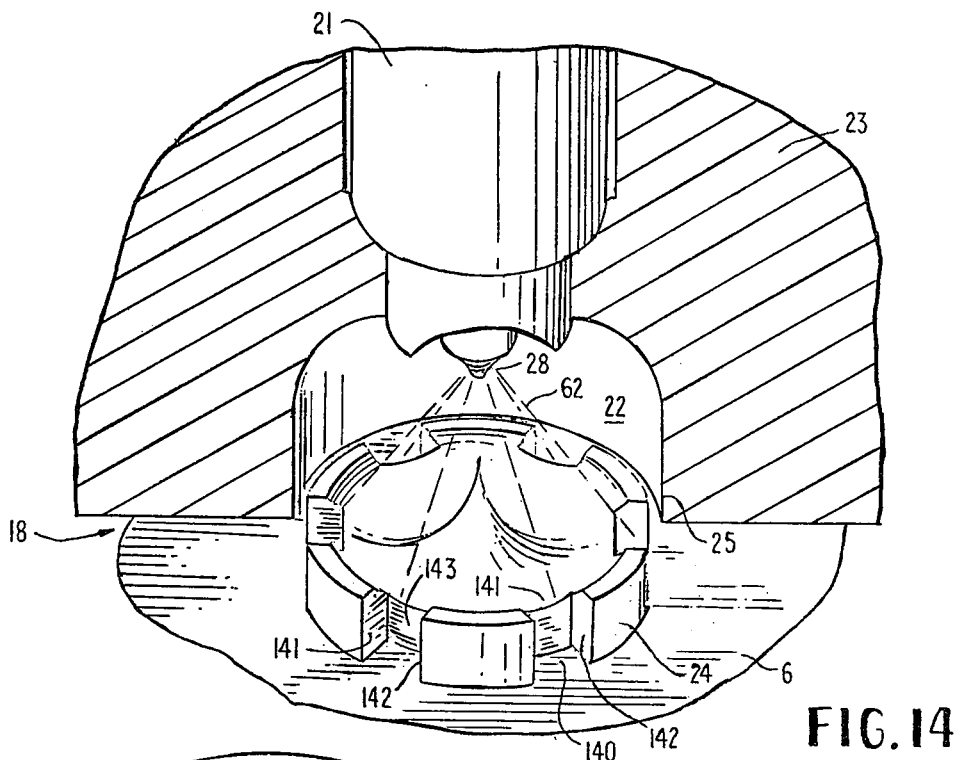
Figure 15:
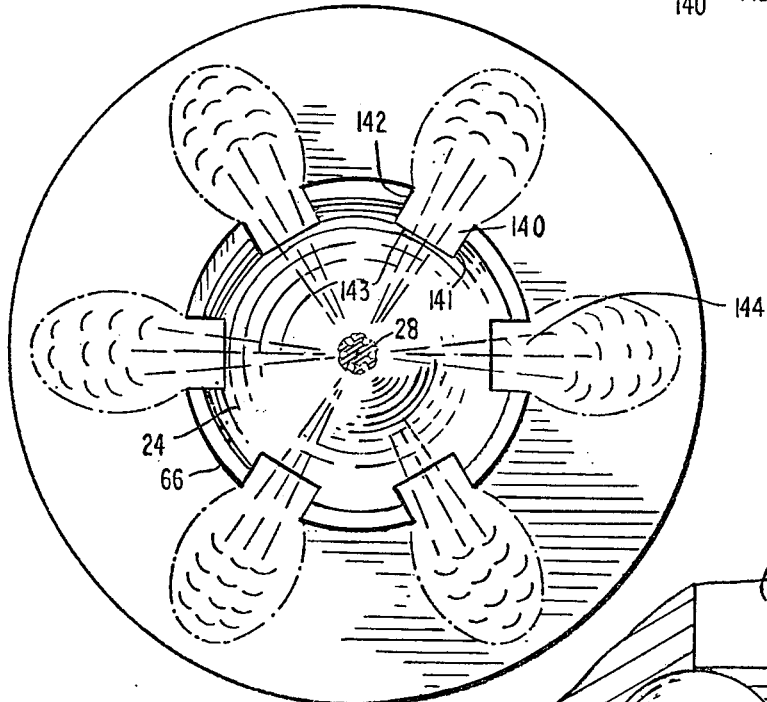
Figure 16:
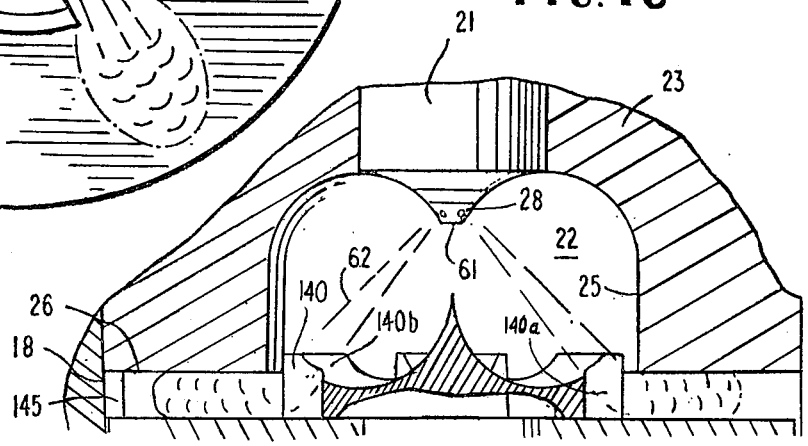
Figure 17:
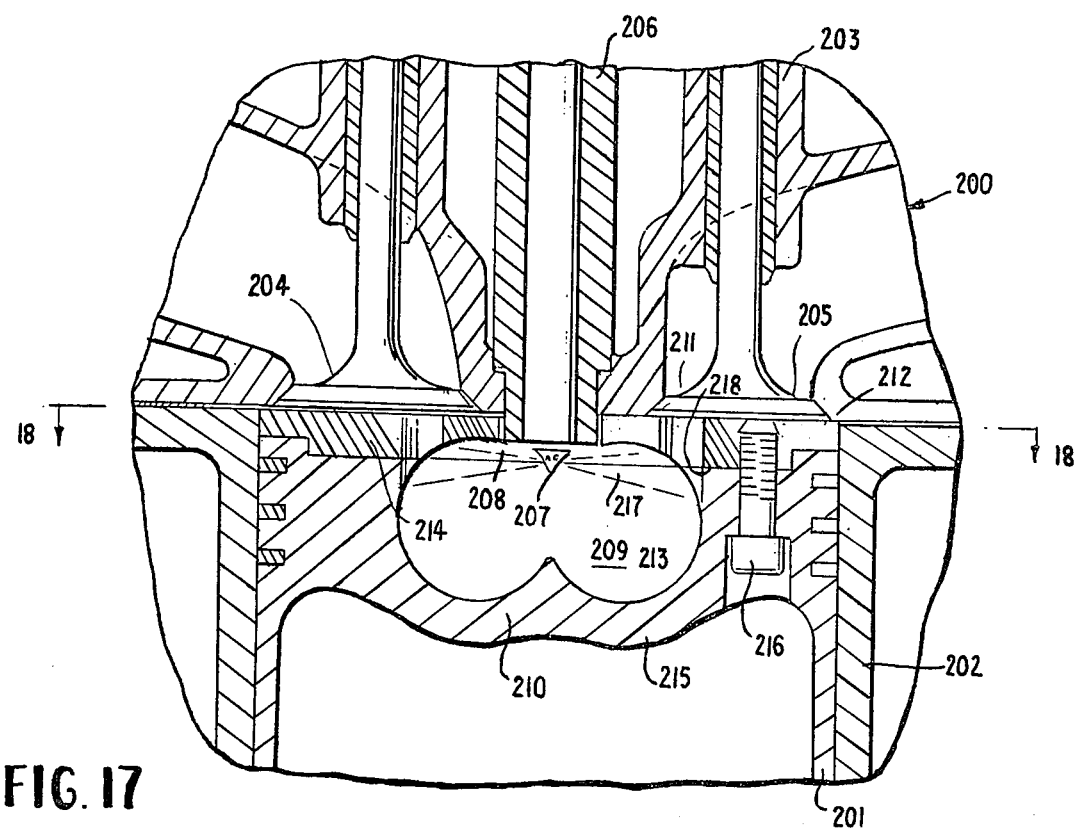
Figure 18:
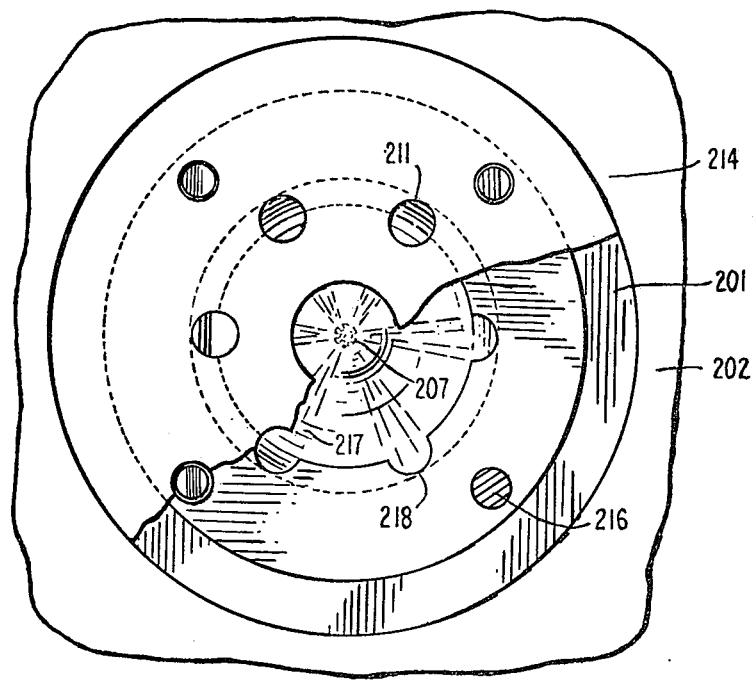

In the drawings:

FIG. 1 provides a vertically sectioned, schematic view of one preferred form of the internal combustion engine of the present invention illustrating basic relationships between a combustion or working cylinder and an air pumping cylinder;

FIG. 2 provides an enlarged, vertically sectioned view of a piston protrusion and cylinder head combustion zone of the FIG. 1 assembly, illustrating the protrusion as it is about to enter the combustion zone;

FIG. 3 illustrates the protrusion received within the combustion zone and moving upwardly;

FIG. 4 provides a partially sectioned, perspective view of the projection and combustion zone as they are disposed while fuel is being injected into the combustion zone by a fuel injection nozzle;

FIG. 5 provides a vertically sectioned, fragmentary view of the protrusion at the point where it commences to withdraw axially out of the combustion zone;

FIG. 6 provides a transverse sectional view of the protrusion and combustion zone as viewed along the section line 6—6 of FIG. 3;

FIG. 7 provides an enlarged, elevational view of the protrusion of the FIG. 1 combustion cylinder, illustrating this protrusion separated from the piston upon which it is mounted for operational purposes;

FIG. 8 provides a top plan view of the protrusion shown in FIG. 7;

FIG. 9 provides a graphical respresentation of the pressure within the combustion cylinder of the FIG. 1 assembly in relation to crankshaft position and the operating condition of the fuel injection nozzle;

FIG. 10 provides a graphical representation of the operating characteristics of a diesel engine fabricated and operated in accordance with the present invention;

FIG. 11 illustrates, in a rotary graph format, the position of the working piston driving crankshaft of the FIG. 1 engine during various phases of a single cycle;

FIG. 12 provides a schematic, graphical representation indicating in general form, but without quantitative precision, a desired ratio relationship which it is believed desirable to maintain between the mass flow rates of combustion supporting gas and fuel passing nto burning loci which are generated within an engine;

FIG. 13 provides a graphical representation of the operating characteristics depicted in FIG. 12;

FIG. 14 illustrates components of an embodiment of the invention where burning loci are generated in slots or paths extending generally parallel with an axis of piston reciprocation;

FIG. 15 schematically depicts, in fragmentary plan view, the manner in which burning loci are formed in the vicinity of the straight slots of the FIG. 15 embodiment. FIG. 15 displays the slots and piston head, with the cylinder wall deleted for clarity of illustration;

FIG. 16 schematically depicts, in side elevational and median sectional view, the formation of burning loci in the FIG. 14 embodiment;

FIG. 17 provides a longitudinal, partially sectioned, fragmentary view of an alternate engine embodiment wherein burning loci defining, wall means are carried in their entirety by a piston head; and FIG. 18 provides a top plan view of the piston head of the FIG. 18 embodiment, as viewed generally along section line 18—18, but with the cylinder wall removed and a tip portion only of the fuel injecting nozzle illustrated.

STRUCTURE AND MODE OF OPERATION OF ONE EMBODIMENT

OVERALL STRUCTURE

FIGS. 1 through 6 illustrate the overall structure of a diesel engine 1 embodying one form of the present invention.

Diesel engine 1 includes a crankcase 2, a pumping cylinder 3, and a working cylinder 4. A piston 5 is reciprocably mounted in pumping cylinder 3 while another piston 6 is reciprocably mounted within the working cylinder 4. A connecting rod 7 journaled on a crankshaft 8 is connected by a wrist pin 9 to piston 5. Another connecting rod 10 journaled on crankshaft 8 is connected by a wrist pin 11 to piston 6. Viewing the engine 1 as shown in FIG. 1, crankshaft 8 rotates in a clockwise direction.

One or more air inlet ports 13 in cylinder wall 3 provide communication with a source of air. An outlet port 14 provides communication between the cylinder interior zone 12 and a conduit 15. Conduit 15 serves to feed air to air inlet ports 16 formed in the side wall of cylinder 4. An exhaust port 17 is formed in cylinder wall 4 and serves to discharge products of combustion.

Crank arms 7 and 10 are both journaled on crankshaft portion 8a, which is off-center from the axis 8b of crankshaft rotation. With the illustrated "right angled" relationship between cylinders 3 and 4, pistons 5 and 6 will operate 90° out of phase. Thus, piston 5 will uncover ports 13, allow air to enter zone 12, and again cover ports 13 while piston 6 is moving on a "down" stroke.

During the first part of the downward movement of piston 6, after piston 5 has moved "down" to uncover ports 13, and while air is entering the zone 12 by way of the uncovered ports 13, the ports 16 will be closed by piston 6. Ports 16 will remain closed during an intermediate part of the down stroke of piston 6 while piston 5 is commencing to move up. During the terminal part of the "down" stroke of piston 6 and the initial part of the "up" stroke of this piston, piston 5 will be moving upwardly, with ports 13 uncovered, and transfer air from chamber 12 through conduit 15, to zone 18. This transfer will result from piston 6 "clearing" or uncovering the air inlet ports 16. After this air has been transferred to zone 18, and ports 16 have been closed by the upwardly moving piston 6, it will be compressed and heated for ignition purposes as a result of continued "upward" movement of piston 6.

FIG. 1 illustrates working cylinder 4 with conventional liquid cooling passages 19. In a conventional fashion, cooling fluid may be circulated through the passage means 19 so as to maintain the temperature of the cylinder 4 within acceptable limits.

A conventional fuel pump 20 is mounted on engine 1. Pump 20 may be operated, for example, by a conventional cam mechanism associated with the crankshaft 8. This fuel pump 20 serves to supply liquid fuel, such as light oil, to a fuel injection nozzle 21. Fuel injection nozzle 21 discharges this fuel in the form of spaced sprays into a combustion zone 22 located in the cylinder head 23 of working cylinder 4. The crankshaft controlled fuel pump 20 serves to start and stop the injection of fuel into zone 22 in accordance with a cyclic injection pattern to be hereinafter described in greater detail.

The manner in which combustion is effected within the cylinder 4 is uniquely controlled by the combustion zone 22 and a protrusion 24 mounted on the working face or fluid reaction face of piston 6.

COMBUSTION CONTROL BY COMBUSTION ZONE AND PISTON PROTRUSION

Combustion zone 22, as shown in FIGS. 2 through 6, comprises a cylindrical wall 25 projecting coaxially of the axis of reciprocation of the piston 6 and the central axis of the cylinder 4. Cylindrical wall 25 intersects a generally annular and planar cylinder head surface 26. This surface 26 extends radially of the axis of reciprocation of the piston 6, away from the junction where the cylinder wall 25 intersects the working zone 18.

A semi-toroidal surface 27 is coaxially aligned with the axis of reciprocation of the piston 6 and merges tangentially at its annular periphery with the cylindrical wall 25. As illustrated, the extremity 28 of fuel injection nozzle 21 defines a portion of surface 27 and provides the central "peak" portion of this semi-toroidal surface 27.

The piston protrusion 24 comprises an annular rim 29 which is coaxially aligned with the axis of reciprocation of the piston 6. A second, semi-toroidal surface 30 is carried by the protrusion 24 in coaxial relationship with the piston axis of reciprocation. Surface 30 is disposed in mirror image relationship with, and faces, the surface 27.

As illustrated, this second, semi-toroidal surface 30 is defined by a circular axis of cross-sectional curvature 31. This axis of curvature extends in a plane passing radially of the axis of piston reciprocation, and through the point tip portion 32 of the surface 30. Thus, the radius of curvature 33 of the left-hand side of the cross section of surface 30, as shown in FIG. 2, is exactly the same as the radius of curvature 34 of the right-hand surface. These two radii 33 and 34, when aligned radially of the piston axis of reciprocation, terminate at the surface point 32.

With the mirror image relationship existing between these surfaces 27 and 30, the radii of curvature 35 and 36 of the left and right-hand sides, respectively, of surface 27 are mutually equal and equal to the radii 33 and 34. Radii 35 and 36 terminate substantially in contiguous relationship with the cylindrical wall 25, where this wall 25 tangentially merges with surface 27.

When piston 6 is disposed at the extremity of its compression stroke as shown in FIG. 5, a slight axial gap 37 will exist between the annular surface 26 and an annular piston surface 38. Surface 38 comprises an annular fluid reaction surface on the working end of piston 6. Surface 38 projects radially away from the protrusion 24. With piston 6 thus disposed at its compression travel extremity, the circular axis of curvature 31 of surface 30 becomes coextensive with the circular axis of curvature 39 of the cylinder head toroidal surface 27, as generally shown in FIG. 5. At this point, the illustrated radii 33, 34, 35 and 36 become axially aligned, i.e. coplanar.

A series of peripheral slots, passages, or paths 40 are formed in the outer periphery of rim 29. The cylindrical outer periphery 41 of rim 29, interrupted by the slots 40, is telescopingly received within the cylindrical wall 25 in a non-interfering fit relationship. The somewhat exaggerated radial clearance 42, shown in the drawings as existing between the rim periphery 41 and the cylindrical wall 25, provides for this non-interfering fit relationship and ensures that the protrusion 24 is freely reciprocable within the wall 25. In actual practice, it is contemplated that the clearance gap 42 may have a radial dimension somewhere on the order of a few thousandths of an inch, i.e. more manufacturing tolerance necessary to insure proper piston reciprocation. Each slot 40 includes a planar inner wall 43 which extends parallel to the axis of reciprocation of piston 6 and perpendicular to a radius extending from this axis. The radially outermost side 44 of each slot 40 is open, as shown in FIG. 6.

As illustrated in FIGS. 4 and 6, the circumferentially spaced sides of this slot 40 are defined by a pair of mutually parallel, planar, side walls 45 and 46. Side walls 45 and 46 are parallel to the radius which is perpendicular to the slot base 43 and which extends from the piston axis of reciprocation 47. This radius intersects each surface 43 circumferentially midway between the slot sides 46 and 45 and axially midway between the slot top edge 48 and the slot base wall lower edge 49.

The slots 40 may be symmetrically disposed about the periphery of rim 29, i.e. evenly circumferentially spaced. In the illustrated embodiment six such slots are provided. However, the number of slots may vary depending upon engine requirements. For example, more or less slots may be employed. In addition, the slots 40 may be inclined as shown in FIGS. 1 and 4, "straight" as shown in embodiments 140 of FIG. 14, or possibly oriented and configured in still different ways.

The top edge 48 of the slot base wall 43 is sharp or knife-like in character, owing to the fact that it is defined by the intersection of planar surface 43 and planar surface 30. The top edge 50 of slot side wall 46 and the top edge 51 of slot edge side wall 45 are also sharp or knife-like, resulting from the planar intersections of surfaces 46 and 45, respectively, with the interrupted annular surface 52 which defines the top of rim 29 and which extends generally radially of the axis of reciprocation of the piston 6.

Thus, the slots 40 provide airstream defining orifices of "flow paths" circumferentially spaced about the periphery of the protrusion 24 and the axis of piston reciprocation. Each such flow path of the FIG. 1 embodiment extends generally longitudinally of the axis 47 of the piston reciprocation and is inclined relative to the axis of reciprocation in a direction extending circumferentially about the combustion zone 22.

Protrusion 24 is secured to piston head wall 53 by a mounting stud 54. Mounting stud 54 projects axially through a central aperture 55 fromed in piston head wall 53. A threaded nut 56 threadedly engages the threaded lower end 57 of the stud 54. Nut 56, acting through washers 58a and 58b, serves to elastically anchor the protrusion 24 to the head wall 53 by engaging a series of Bellville spring washers 59. This resilient anchoring arrangement tends to ensure that the protrusion 24 does not become separated from the piston head wall 53 during engine operation. If desired, anchoring pin 60, schematically shown in FIG. 2, may serve to fixedly secure the nut 56 on the threaded study portion 57. Pin 60 transversely intersects threaded stud 57 and nut 56, after these components have been assembled, so as to prevent rotation of the nut 56 which would tend to remove it from the stud end 57.

As will be appreciated, this mode of mounting the protrusion 24 requires minimum alteration of the conventional structure of the piston 6.

The terminus 28 of nozzle 21 is provided with a series of circumferentially spaced, fuel spray or jet defining nozzle-like orifices 61. The nozzles or orifices 61 are oriented so as to project a series of six fuel sprays 62 projecting into the combustion zone 22. These fuel sprays 62 are mutually distinct and circumferentially spaced from each other. The sprays 62 are more or less aligned with a conical plane, i.e. a phantom or imaginary surface, diverging downwardly from the tip 28 and intersecting all of the slots or flow paths 40. This plane of alignment of the spray 62 intersects open ends or mouth 63 of the slots 40 throughout the period of time that the slot-carrying rim 29 is reciprocating within the cylindrical wall 25. This alignment of the sprays results from having the conical alignment plane laterally intersect the circular junction of intersection 64 between the surfaces 25 and 26. In actual practice, the sprays 62 have been directed toward points 64a, located about one-eighth of an inch above the plane of junction 64. The radial width 65 of each orifice 40 is such as to ensure that each spray 62 will continue to enter a slot mouth 63, even when the protrusion 24 has been reciprocated to the extremity position shown in FIG. 5.

At this point, it will be appreciated that when piston 6 nears the upper portion of its reciprocation, so as to cause the rim extremity 52 to be aligned with the cylinder head surface 26, the slots or orifices 40 substantially control fluid communication between the cylinder working zone 18 and the combustion zone 22 formed in cylinder head 23. This fluid communication control, afforded by the slots 40, continues as the piston 6 continues its reciprocation so as to move the protrusion 24 to the ultimate position shown in FIG. 5. This control further continues during the withdrawal or downstroke of the piston 6, until the protrusion 24 returns to the position shown in FIG. 2, i.e. the position where the upper ends 63 of the slots 40 are aligned with the wall 26.

Some limited communication between the zones 18 and 22 may exist through the clearance gap 42. However, this highly limited degree of communication is of relatively small or no consequence in relation to that afforded by the slots or paths 40.

DIMENSIONAL AND CYCLE CRITERIA

Dimensional and cycle criteria relating to certain test engines has been delineated in the foregoing application Ser. No. 739,434, the entire disclosure of which is herein incorporated by reference.

The teachings of the invention have been applied specifically to the operation of small diesel engines rated at five horsepower. In at least one of these engines, the cylinger has a 2.75 inch diameter bore and a 3 inch stroke.

A variety of protrusions 24 have been incorporated in the piston head 53 of this engine or similar engines, with variations in numbers and dimensions of slots having been tested and with both inclined and straight slot patterns having been used. In general, the semi-toroidal surfaces 30 of these protrusions have been dimensioned such that radii 33, 34, 35 and 36 were between 0.307 and 0.315 inches. The diameter of the cylindrical peripheries of protrusions 24, as defined by a cylindrical surface 66, has generally been on the order of between 1.185 and 1.191 inches.

The axial height 67 of wall 41 of these protrusions was generally between 0.222 and 0.285 inches. The perpendicular distance between walls 45 and 46 was generally on the order of from about 0.240 inches to about 0.314 inches. The radial gap between each wall 43 and the cylindrical surface 66, which is coextensive with walls 41, was at times on the order of from about 0.120 inches to about 0.140 inches.

The protrusions 24 were fabricated from stainless steel.

The protrusion dimensions substantially determine the dimensions of the combustion zone 22, in view of the relationships between the protrusion and the combustion zone previously described.

It is contemplated that the radical tolerance 42 between the walls 41 and the cylindrical wall 25 may be on the order of 3/1000th to 5/100th of an inch. For all practical purposes, it may be assumed that no meaningful air flow passes through this tolerance zone.

The axial gap 37 between surfaces 26 and 38 of some tested engines, when the piston 6 was in its uppermost position and as schematically shown in FIG. 5, was generally on the order of 20/1000th to 37/100th of an inch. The gap 68 between the tip 32 and the lower extremity of the nozzle 21 in certain engines, when the piston was in its uppermost extremity was generally on the order of 200/100ths of an inch.

Tests on engines in this general nature were conducted with slots 40 where the slot side walls 45 and 46 ranged from being parallel to the axis of reciprocation of the piston 6 so as to define "straight" slots, through angles of inclination, relative to radial planes extending perpendicular to walls 43 and parallel to the axis of reciprocation, on the order of 18°, 30° and 45°. Generally, somewhere on the order of five or six, identically oriented, peripheral slots 40 were employed for uniform evauation purposes, although protrusions with more or less slots might be used. The dimensional criteria of the engine, under varying test conditions, was such that the protrusion rim top surface 52 became aligned with the cylinder head surface 26 at a point of crankshaft rotation about 28° to 35° prior to the position of crankshaft rotation operable to bring the piston 6 to its uppermost extremity.

In the example shown in FIG. 11, this alignment occured at about 29° before the top dead center crankshaft position. This means, of course, that in this example the protrusion 24 reciprocated with the cylindrical wall 25 for a total increment of crankshaft rotation of about 58°. (An example where such protrusion control is extended to about 70° of crankshaft rotation is subsequently discussed). Throughout this total increment, the slots 40 substantially provided complete control of fluid communication between the zone 22 and the zone 18. Significantly, the zone 18, although reduced to several thousands of an inch in axial extent in the FIG. 5 extremity position, always remained in existence so as to provide a zone, sharply inclined relative to "flow paths" 40, and into which products of combustion could flow.

In several tests which were conducted, the fuel pump 20 was operated by timing means so as to initiate the injection of the fuel streams 62 into the zone 22 at a point of crankshaft rotation only a few degrees, sometimes about 4° to 6°, ahead of the crankshaft extremity position operable to position the piston in the FIG. 5 orientation. The orifices through which the fuel stream 62 were projected for some tests each had a diameter of about 0.005 inches. Observations indicate that combustion was initiated within 2° or 3° of continued rotation of the crankshaft, i.e. combustion was initiated almost simultaneously with the injection of fuel and almost at the point where the piston was at top dead center of the cylinder 4.

Injection of the fuel streams 62, in some tests, was generally continued for a total increment of from 12° to 15° duration after top dead center. For moderate speed engines, fuel stream injection commencing about 5° before the top dead center piston position and terminating as long as 20° after this top dead center position was believed to be beneficial in some tests. With this range of fuel injections, combustion will continue for a few degrees after the injection of the fuel streams has ceased. it is believed that this combustion will terminate prior to the existing of the protrusion 24 from cylinder wall 25.

Thus, it is belived that with a tolerance of only a few degrees of crankshaft rotation, combustion was both initiated and terminated very nearly coincident with the initiation and termination of fuel injection. Further, combustion was initiated in uniquely close proximity to the top dead center piston location.

The relationships between fuel injection, fuel burning, and the position of the protrusion 24 within the cylinder wall 25 are illustrated in the crankshaft cycle diagram shown in FIG. 11.

In FIG. 11, the shaded zone A represents the period of rotary movement of the crankshaft during which the protrusion 24 is telescoping within the cylinder wall 25. The fuel injection pattern is shown by the shaded segment B. From observation, it is believed that burning occurs within the general zone represented by the shaded segment C.

GENERAL MODE OF OPERATION OF ENGINE

The general mode of operation of engine 1 will be described with reference to a single cycle, commencing with the initiation of the upstroke of the piston 6.

During the upstroke, after the ports 16 and 17 have been closed, zones 18 and 22. Once the protrusion 24 commences to enter the cylindrical wall 25, i.e. when the surfacee 52 becomes aligned with the surface 26, the continued upward movement of the piston 6 will cause the air in space 18 to be further heated and compressed. This further heated and compressed air will flow from the zone 18 radially inwardly into the open sides slots 40.

Because of the channeling influence of the slots 40, the heated and compressed air will be increased in velocity so as to flow turbulently, generally longitudinally and upwardly through the slots 40. The inclination of the slots 40 will tend to cause the airstreams, defined by the orifice-like slots 40, to enter the chamber 22 and flow along the wall 25 in a generally spiral pattern. When straight slots are used, the air will enter the chamber in an axial flow pattern. These upwardly moving airstreams will encounter the arcuate surface 27 and the deflected generally radially inwardly toward the axis of reciprocation 47 and then generally downwardly toward the arcuate surface 30.

The flow pattern of the airstreams is somewhat uncertain, insofar as the zone between surfaces 27 and 30 is concerned. Airstreams leaving the right side of the surface 27 may tend to initially cross over into the left side of the surface 30, viewing the surfaces in the general arrangement shown in FIG. 2. As the surfaces 27 and 29 converge, this cross over tendency may be somewhat minimized, i.e. airstreams deflected from the right side of the surface 27 may tend to enter the right of the surface 30.

As the protrusion 24 nears the extremity of its upstroke, the fuel streams 62 will be projected into the zone 22. As generally shown in FIGS. 3 and 6, each stream will be directed so as to continuously enter the slot mouths 63, while the slots 40 receiving the streams are reciprocating both into and out of the wall 25.

When the fuel streams are initially projected into the zone 22 before the "top dead center piston" position, each generally downwardly flowing fuel stream 62 will initially encounter a generally upwardly flowing airstream in the pocket-like slot 40. The generally countercurrent flow between these air and fuel streams, coupled with the high velocity and heated character of the airstreams, will tend to produce mixing, agitation and turbulent flow in each slot 40 operable to almost instantaneously heat and disperse the fuel of the fuel stream throughout the airstream. The peripherally confining effect of the walls 45, 43 and 46, in each slot, will tend to effectively confine and thereby intensify this fuel dispersion and heating, so as to make the fuel almost instantaneously amenable to combustion.

Pursuant to the conventional mode of operation of a diesel engine, the compression induced heat will ignite the fuel. From observations, it is known that burning of the fuel is localized in the general vicinity of the slots 40. By describing burning, as occuring in the zones defined by the slots 40, it is meant that these zones, where the fuel and air interest, provide circumferentially spaced, burning loci or centers, with it being recognized that burning will exist beyond the confines of these slots.

It is believed that burning may be initiated somewhat above the upwardly moving orifices 40, in the general vicinity of the fringes of the fuel streams 62. However, regardless of where burning is initiated, it is known from observations that the intersection zones or orifices 40 define spaced centers or loci of burning. In this connection it is also believed that, even though burning may be initiated somewhat above the orifices 40, the bulk of the fuel in the downwardly directed streams 62 will enter the orifices 40 for effective dispersion and heating.

In here describing the direction of flow of the fuel streams and airstreams, reference has been made to directions resulting from the illustrated posture of components in FIGS. 2 through 6. Obviously, these directions would vary, depending on engine orientation.

The injection of fuel into the zones 40 continues as the piston 6 moves to the top dead center position shown in FIG. 5. The bulk of fuel injection occurs while the protrusion 24 moves downwardly out of the zone 22 but is still retained within this zone.

During the downward movement of the protrusion 24, and while fuel is being injected, air previously injected into the zone 22 and heated through combustion and compression, flows generally downwardly out of the zone 22. It is believed that this phenomena, in conjunction with the generation of burning loci, largely accounts for the beneficial results of the invention. This air flows through the slots 40 and into the burning loci which project into the annular zone 18. This zone 18 communicates with the fluid reaction surface 33 of the piston 6. It is believed that this outward flow of heated air contributes, in a particulary effective manner, to the heating and dispersion of fuel in the peripherally confined intersection zones or pockets 40 and the burning loci associated with these slots.

The injection of fuel streams 62 terminates prior to the existing of protrusion rim 29 from cylindrical wall 25.

It will be recognized that turbulence and some degree of chilling is probably generated by air flowing axially and then radially outwardly from the zone 22 through slots 40 into the zone 18 during the downstroke of the protrusion 24. During this downstroke the air flowing axially outwardly from the zone 22 is radially and outwardly deflected by surface 38, as shown in FIG. 5, so as to flow generally radially outwardly toward the cylinder periphery. This multidirectional deflection, which occurs in a reverse sense on the piston upstroke, is believed to effectively contribute to the formation of turbulent flow in the zone 40 and the heating, dispersion and combustion of fuel in the burning loci associated therewith.

It is believed that the airstreams, which are deflected and somewhat dispersed, during piston upstroke, by their impingement upon the surfaces 27 and 30 may provide a degree of overall turbulence but this turbulence does not destroy the essential integrity of the fuel streams 62.

It is also believed that the burning of fuel coincides so closely with the fuel injection increment that burning is substantially completed prior to the time that the protrusion 24 leaves the combustion zone 22.

DISCUSSION OF EXEMPLARY STRAIGHT SLOT EMBODIMENT

In an engine exemplary of the invention, shown in FIGS. 14–16, the protrusion 24 is provided with a plurality of circumferentially spaced, straight slots 140. In the illustrated embodiment, six such straight slots 140 are utilized. However, other numbers of slots, for example five or more or less, might be employed in the practice of the invention.

Each such straight slot 140 is defined by flat side walls 141 and 142, and flat base walls 143, all of which cooperate with wall means 25 to define a series of straight flow paths extending parallel with and encircling the axis of piston reciprocation.

As in the case of the FIG. 1-6 embodiments, the fuel streams 62 are injected so that throughout the bulk of the injection operation, the flow as generally discrete albeit possibly diverging and somewhat particulated streams, each intersecting a slot 140. The protrusion 24 may enter the chamber 22 at a point corresponding to about a 35° increment of crankshaft rotation prior to the "top dead center", piston position, and thus leave the zone 22 at a point equal to about 35° of crankshaft rotation after the "top dead center piston position. In this condition, it is contemplated that the fuel streams 62 will be injected in large part, or indeed nearly in their entirety, during the downstroke or working stroke of the piston 6, with this extended period of slot defined and controlled communication between zones 22 and 18 being governed by the protrusion 24. In this instance, the duration of fuel injection, indicated generally by the shaded area B on the FIG. 11 chart, may be extended to somewhere on the order of 25° or more of crankshaft rotation.

FIGS. 15 and 16 schematically illustrate the manner in which the fuel streams 62 and the heated airstreams, flowing from combustion chamber 22 into working zone 18 synnergistically cooperate with slots 140 to form a series of circumferentially spaced, schematically illustrated, discrete burning "centers" or burning loci 144. While such burning outside of the loci may tend to peripherally merge or mutually approach, in a circumferential sense, within the zone 18, actual observations have established the existence of discrete, relatively high intensity burning centers 144 aligned with the slots 140.

During the downstroke of the piston 6, away from the top dead center position, the fuel streams 62 will pass into the slots 140, as will heated air from the space 22. This air will be initially heated by compression during the upstroke of the piston 6 and be further heated by the ignition of burning during the fuel injection operation. Ignition or initiation of burning in zone 22 may be facilitated by the "fuzz" or peripheral and particulated portions of the generally individually defined streams 62.

As thus will be recognized, with the initiation of fuel injection being timed so that combustion begins at approximately the top dead center location of the piston 6, the burning loci 144 will be generated and maintained during the working stroke of the piston 6.

BALANCING OF MASS FLOW RATES OF COMBUSTIBLE FUEL AND COMBUSTION SUPPORTING AIR

As will be apparent from the foregoing discussion and with reference to FIG. 16, at the top dead center position of the piston 6, the axial width of the gap 145 between surfaces 38 and 26 will cause the generally radially outwardly directed, outlet portion 140a of each slot 140 to have a cross sectional area substantially smaller than the effective cross sectional area of the inlet mouth 140b. The inlet mouth 140b of each slot 140 which may be generally viewed as comprising the cross sectional area of the slot 140, measured perpendicular to the axis of piston reciprocation.

As the piston 6 continues its downward movement, the outlet portion 140a of each slot 140 will progressively increase in size. Thus, the initially flow restricting effect of the outlet 140 (because of its being smaller than the inlet mouth 140b) will progressively diminish during the piston downstroke. At the point in time where the outlet 140 has a flow capacity exceeding that of the inlet mouth 140b, the mouth 140b will perform a flow restricting function determinative of gas mass flow through the slot 140.

At least until the point in time where outlet opening 140a has a flow capacity at least equal to that of inlet mouth 140b, the mass flow rate of combustible air passing from the space 22 into the annular zone 18 will continuously increase.

Because of the heating effects of the burning loci 144, it is believed that by the point in time when inlets 140b control mass flow of air through the slots 140, the intensified heating of gas in the space 22 will induce a significantly increased mass flow rate of combustion supporting air through the slots 140, even with mouths 140b controlling slot flow.

In short, and based on empirical observations and reasonable prognoses of slot performance, it is now believed that the mass flow rate of combustion supporting air through the slots 140, during the piston downstroke, will increase in a generally linear fashion as shown in FIG. 12. (The abscissa of FIG. 12 depicts degrees of crankshank rotation, extending to the right from an ordinate aligned, "top dead center", piston position. The ordinate of the FIG. 12 graph indicates, the an upward direction, an increasing mass flow rate of combustible air passing through the slots 140). As will be apparent, FIG. 12 is schematic in nature, predicated upon reasonable prognoses and empirical observations, and for this reason does not contain specific abscissa and ordinate values. In other words, FIG. 12 should be viewed as schematic and qualitative in nature—not quantitative.

The projected air mass flow rate line 145 of FIG. 12, depicts the progressive and relatively gradual increase in mass flow rates of fuel during the fuel injection operation (depicted generally by portion C of the engine performance graph shown in FIG. 11).

Thus, it is believed, as indicated by the line 146 of FIG. 12, that the mass flow rate of combustible fuel injecteed into the space 22 desirably should relatively gradually and progressively increase during the initial "slot controlled" portion of the downstroke of the piston 6. This will tend to maintain a consistent or predetermined balancing or ratio between the mass flow rates of combustion supporting air and combustible fuel passing through the slots 140. In this connection, the rightmost abscissa of the FIG. 12 chart, qualitatively and in an upward direction, depicts an increasing mass flow rate of fuel.

Fuel injection, in the previous examples, was terminated before the protrusion 24 left the combustion zone 22. It is now believed desirable, consistent with this concept of balanced air-fuel flow, to generally, or at least relatively, abruptly terminate the fuel flow near the end of the fuel injection operation. This termination of fuel flow is schematically illustrated by the terminal and downwardly directed portion 146a of the line 146, which depicts mass flow rate of injected fuel.

As will be appreciated, the variations in mass flow rate depicted by graph line 146 may be effected by progressively varying the effective displacement and/or pressure of injection pump which supplies fuel to the injection nozzle 21. This might be accomplished by utilizing conventional cams to progressively vary effective injection pump piston displacement rates so as to progressively vary nozzle injection rates. Of course, the operation of such cams could be coordinated with piston movement via crankshaft rotation and drive devices.

In other instances, an injection nozzle and injection pump combination might be selected where the pumping piston moves at a constant rate but the rate of pressure build up in the nozzle is gradual and provides a desired, progressive increase in mass flow rate of fuel. Alternatively, a crankshank (or piston movement) responsive means such as a cam could be employed to progressively open an injector nozzle valve so as to permit a progressive increase in nozzle discharge rate.

In any event, at the present time it is believed that as a desirable operating characteristic the general slope of the initial injection portion 146b should generally parallel or approach the slope of air mass flow curve 145 and be substantially less, in relation to the abscissa, than the slope of the flow cutoff curve portion 146a in relation to the abscissa.

This generally desired operating characteristic is depicted, in another form, by the engine indicator chart shown in Fig. 13. This chart depicts a curve 148 which indicates the variation in pressure of fuel in the injection nozzle. In this connection it will be recognized that the pressure variation will be generally indicative of the variation in mass flow rate of fuel.

Thus as shown in FIG. 13, during an increment 147 of fuel injection, the pressure of fuel progressively increase, as indicated by line portion 148a, until a pressure peak 149 is reached. This peak 149 indicates the point at which injection of fuel commences to terminate. As will be apparent from FIG. 13, peak 149 is located in the terminal half of the increment 147, as near to the fuel injection termination point 150 as possible, with the proximity of pressure peak point 149 to point 150 being determined by such factors as system inertia and nozzle flow limitations. Further, the initial portion 148a of fuel pressure indicating line 148 has a slope substantially less than that of the terminal portion 148b of the pressure indicating line.

Thus, now comparing FIGS. 13 and 12, it will be recognized that the desirable, progressive and reasonably gradual increase of fuel pressure, as depicted by line portion 148a, corresponds to and indicates the desirable, progressive, and relatively gradual increase in mass flow rate of fuel depicted by line portion 146b of FIG. 12. Accordingly, the peak 151 of fuel mass flow rate of curve 146 occurs during the latter half of the fuel injection increment, and the slope of line portion 146b is less than that of line portion 146a.

ALTERNATE ARRANGEMENTS FOR FORMING BURNING LOCI

In the various engine embodiments heretofore described, burning loci have been formed as the result of the cooperative interaction beteen a piston carried protrusion and a cylinder head recess. In the context of this arrangement, it is contemplated that structures could be devised where slot, passage, or path side walls of circumferential peripheral portions would be provided by cylinder head portions instead of by piston protrusion portions.

It is presently believed that burning loci defining paths, under certain circumstances, may be defined exclusively by a cylinder portion or exclusively by a piston portion.

For example, turning to FIGS. 17 and 18 an engine arrangement 200 is disclosed where a piston 201 is reciprocably supported within a cylinder 202. The upper end of the cylinder 202 is closed by a cylinder head 203.

While the engines heretofore described have been of the two-cycle type, the engine shown in FIGS. 17 and 18 may be either of the two-cycle type of alternately of a four-cycle type. If of the latter character, the cylinder head 203 may be provided with a conventional air inlet valve 204 and a conventional exhaust valve 205.

In the four-cycle structure, valves 204 and 205 would be operated in timed coordination with piston reciprocation, in a conventional and well recognized manner.

An injection nozzle 206, corresponding in general to injection nozzle 21, may be mounted in cylinder head 203 as generally shown in FIG. 17. When so mounted, an orifice containing injector tip 207 would project into the interior of the cylinder 202.

As shown in FIG. 17, tip 207, when the piston 201 is in its top dead center position, projects through a piston head aperture 208 into a generally toroidally configured, cavity 209. Cavity 209, as shown in FIG. 17, is disposed symmetrically and concentrically in piston head 210, in relation to the axis of piston reciprocation. Injector tip 207 is disposed in axial alignment with the axis of piston reciprocation.

A series of generally longitudinally extending passages, flow paths, or openings 211 are formed in piston head 210 of piston 201. As illustrated, passages 211 project upwardly from toroidal cavity 209 (viewing the apparatus in the orientation shown in FIG. 17) and provide communication between the cavity 209 and the portion 212 of the cylinder working space above the piston 201.

Passages 211 are disposed circumferentially about the axis of piston reciprocation and are disposed so as to extend generally tangentially from, and thus lie adjacent, the lateral periphery 213 of the cavity 209.

Passages 211 may be formed, in part, from a head plate 214 which is secured to the upper portion of the body 215 of piston 201 by a plurality of threaded fasteners 216.

With this arrangement, the fuel orifices or nozzle tip 207 would be oriented so as to direct fuel streams 217, individually, into generally vertically extending, outer side wall portions 218 of passages 211. The length of side wall portions 218, as shown in FIG. 17, would be such as to ensure that so long as the tip 207 was telescopingly received within the piston aperture 208 and during fuel injection, the fuel streams 217 would be injected generally radially, or at least laterally outwardly of the tip 207, so as to be directed against the wall portion 218 of the passages 211.

With this arrangement, and with fuel streams 217 being generated in large part or in their totality during the downstroke of piston 201, the cavity 209, passages 211, and tip 207 would cooperate to form burning loci aligned with the passages 211 and projecting into the working space 212.

In a similar but diverse manner, the chamber 209 and injector tip 207 could be located in their entirety in the cylinder head 203, with the passages 211 projecting downwardly from the cylinder head into the working space 212. Of course, with this arrangement the tip 207 would be in permanently fixed position relative to the passages 211 so as to facilitate the generation of burning loci. With this arrangement the orifices of tip 207 might desirably be oriented so as to project the streams 217 downwardly toward the lower located and now downwardly directed passages 211.

ADVANTAGES AND SCOPE OF INVENTION

FIG. 9 graphically represents the operating characteristics of one of the previously described engines, described in connection with FIGS. 1–6 and FIG. 11, operating at about 2200 r.p.m.

Curve A in FIG. 9 represents the pressure within the cylinder 4 resulting solely from the compressive action of the piston 6. Curve B, which defines a continuation of the initial part of curve A, represents this pressure, plotted against crankshaft postion, and resulting from the combustion cycle. Curve C indicates the position of a valve in the fuel injection mechanism which serves to control the admission of fuel to the orifices 61 for the purposes of defining the fuel streams 62.

As will be seen, in the FIG. 11 example, the fuel controlling valve commenced to open at point D, within about 6° of the top dead center position of the crankshaft and piston. Ignition occurred at about point E, i.e. within about 3° of both the top dead center position and the point where the fuel controlling valve commenced to open. The flow controlling fuel valve closed between points F and G, with valve closing commencing at point F. It is believed that the total ignition cycle terminated within the 58° increment of crankshaft rotation during which protrusion 24 reciprocated within cylindrical wall 25.

It is significant to here note that the initiation of combustion was effected almost concurrent with the initiation of fuel injection and almost concurrent with the top dead center position of the piston.

Tests conducted with the previously described engine reflect significantly improved operating characteristics. For example, as shown in FIG. 10, the indicated specific fuel comsumption, at rated horsepower, was on the order of 0.29 pounds per horsepower per hour. This reflects unique combustion efficiency and is believed to be attributable to the particularly effective fuel mixing and combustion which occured in the slots or zones 40.

The noise associated with this engine was substantially less than that associated with the conventional engine. Further, the exhaust temperature of the engine was observed to be between 200° and 300° F. coller than the exhaust of a normal engine.

Engine starting characteristics were significantly improved. For example, unaided starting was able to be effected at ambient temperatures as low as 10° F.

It was also observed that the engine developed its rated power, under moderately heavy loads with rates of pressure rise within the cylinder on the order of 20 p.s.i. per degree of crankshaft rotation. This is significantly below the 50 p.s.i. level where diesel "blocking" noise ordinarily commences.

This lower rate of pressure rise, of course, produces a significantly lower peak combustion pressure. This lower peak combustion pressure produces significantly less strain on the engine frame and engine parts.

The turbulent flow in the zones 40 produced such effective fuel mixing as to significantly extend the range of nature of fuels which could be injected into the combustion zone. Further, this wall means 25 functioned (as would wall means 218) as axially aligned extensions of the outer edges of the slots or flow paths so as to peripherally confine the intersection of air and fuel streams to the zone of flow path mouths and thus insure the transmission of interacted fuel and air directly into the flow paths and burning loci, In short, the invention presently defined resides in the generation of burning loci and the maintenance of such buring loci during a piston working stroke and the consequential production of effective fuel dispersion and heating during the working stroke so as to yield nearly instantaneous combustion, and more even, prolonged, and smooth burning. This enables an engine to be operated under nearly optimum conditions where fuel is injected and starts to ignite at very nearly the top dead center piston position. This also enables an operator to have almost complete control over fuel burning so as to control, effectively and predictably, the output characteristics of the engine. This effective fuel combustion substantially reduces carbonization tendencies so as to reduce the operating temperature of the engine. This tendency to reduce carbonization is desirable since carbon deposits, when formed, do not cool as rapidly as the enigne structure. Thus, such carbon deposits tend, undesirably, to raise the operating temperature of the engine.

It is now believed that a particular advantage of the invention may entail a significant reduction in undesirable oxides of nitrogen generated during engine operation. In thus reducing the undesired nitrous oxide content in exhaust gas, the combustion concept of the present invention constitutes a device for significantly reducing the level of atmospheric pollution resulting from engine operation. The precise phenomena tending to reduce the formation of oxides of nitrogen is not presently fully understood. However, the reduction in the formation of undesirable oxides of nitrogen is believed to be substantially attributable to the reduced operating temperatures of the engine of this invention.

The bulk of the advantages of this basic invention, as presently claimed, are believed to be derived from the generation and maintenance of burning loci, with heated air and fuel passing into such loci during the piston downstroke, and with the bulk, if not all, of the injected fuel being injected during the downstroke or working stroke of the piston. In the context of this basic concept, the synergistic interaction of the burning loci, heated air streams, and fuel streams is believed to provide an extraordinarily effective heating, disruption, and even burning of injected fuel, with burning being prolonged and largely confined to the working stroke of the engine and of prolonged duration.

However, in relation to the definition of loci with piston carried slots, or where the airstreams are defined, i.e., located and maintained by cooperation of piston carried wall means and a cylinder cavity, this separately significant invention embodiment characterizes claimed subject matter of the aforesaid application Ser. No. 739,434.

The heated air and fuel flowing into the "flow paths" and their associated burning loci during the downstroke of the piston, and the balancing of air and fuel mass flow ratios as the capacity of, and/or actual flow through the flow paths progressively increases, is believed to contribute in an extraordinarily effective fashion to the smoothness, evenness, prolonged, and controlled nature of fuel burning. This is believed to result from the effective fuel dispersion and heating caused by the interaction and intersection of the outflowing, hot air with the fuel streams discharging into the general vicinity of the "flow paths" and the continued maintenance of a generally desired ratio of air and fuel mass flow rates. The right-angled or mutually inclined relation between the burning patterns in the work chamber and the "flow paths" is believed to aid in this respect.

At this point, while it is known that the circumferentially spaced slots vastly improve engine operating conditions, it is believed that the locations, mode of forming and operating, dimensional characteristics, number, shape, and size of the fuel injection nozzle orifices, and/or the "flow paths", and the shapes, sizes and mode of producing the combustion and working zones, may be substantially varied while retaining advantages of the invention. However, at the present time, it is believed that the axially longer embodiments of the piston protrusion, where the piston carried protrusion embodiment is employed may contribute to especially quit engine operation.

It is believe that the invention is applicable to the operation of spark plug ignited, gasoline engines as well as compression ignited diesel engines, to the operation of two or four stroke engines, air or liquid cooled engines, single or multiple cylinder engines, and engines provided with "boosted" or "unboosted" air supplies. However, a "boosted" or turbo charged engine is believed to perform with particular efficiency in the practice of the invention.

It will here be recognized that this invention constitutes a marked departure from the teachings of such prior patents as the Tartrais U.S. Pat. No. 1,450,567, the Basabe U.S. Pat. No. 2,658,487, the Camner U.S. Pat. No. 2,682,862, the Froehlich U.S. Pat. No. 2,966,145, the Held U.S. Pat. No. 1,696,799 and a Saurer Swiss Pat. No. 175,433. These patents disclose either structures which bear superficial resemblance to the present invention or structures operable to provide turbulence in the combustion end of a cylinder. However, none of these patents suggest or disclose line concepts of forming burning loci with intersecting fuel and airstreams passing into the loci or the passage of high velocity, heated air through fuel streams being confined substantially to the withdrawing movement of a piston, either and/or both of which concepts characterize the present invention.

Indeed, evidence of unobviousness of the present concept is provided by art of this nature as well as by art exemplified by British Pat. Nos. 211,146 (1924), 548,855 (1942), 760,860 (1956), 984,255 (1965), and 998,915 (1965) and by Wygodsky U.S. Pat. No. 1,263,986, Schneider U.S. Pat. No. 1,605,000, Barrett U.S. Pat. No. 1,772,742, Sperry U.S. Pat. No. 1,867,683, Dolan U.S. Pat No. 1,955,056, Mock U.S. Pat. No. 1,981,875, Huesby U.S. Pat. No. 2,107,792, Kogel U.S. Pat. No. 2,561,628, Dolza U.S. Pat. No. 2,868,181 and Eyzat U.S. Pat. No. 3,386,422.

Patents as aforenoted disclose a variety of combustion concepts, with patents like Eyzat, Dolza, Huesby, Mock, Dolan, Sperry, Barrett, Schneider, and Wygodsky utilizing piston protrusions and cylinder head cavities. Patents such as Huesby, Kogel and Schneider contemplate various arrangements for injecting fuel in interacting relation with air flows. However, these foregoing patents evidence a consistent failure in the art to contemplate the formation of burning loci, and particularly the formation of such burning loci where the bulk of fuel is injected during a piston downstroke and where heated air and fuel streams are projected into burning loci. Instead of the formation of burning loci, this art teaches overall or area wide burning patterns in combustion chambers—the very antithesis of the present, discrete, burning loci.

Instead of providing a concept which enables the bulk of fuel injection to be confined to a working stroke of a piston, art such as that exemplified by the Sperry, Barrett, and Eyzat patents contemplate that fuel should be injected in large part on the upstroke of a piston. While Eyzat recognizes that a limited portion of fuel may be injected during the initial part of a downstroke, this patentee, like Sperry and Barrett, teaches squarely away from the present inventive concept of forming burning loci and confining the bulk of the fuel injection to the piston downstroke.

While art such as Dolan appears to contemplate fuel injection on a piston downstroke, it emphasizes the establishment of overall area burning instead of the formation of burning loci and fails totally to recognize the concept of passing heated air and fuel streams into such burning loci.

Thus, taken as a whole, the art leads away from the present invention and evidences its unobviousness.

In describing the invention, reference has been made to preferred embodiments. However, those skilled in the combustion art and familiar with the disclosure of these embodiments may well recognize additions, deletions, substitutions or other modifications which would fall within the scope of the invention as defined within the appended claims.

We claim:

1. A method of effecting combustion in internal combustion engines said method comprising:
generating, within engine means, and in energy communicating relation with piston means movable in cylinder means of said engine means, a plurality of generally mutually distinct burning loci, with said burning loci defining generally spaced centers of burning;
concurrently, and during a working stroke of said piston means of said engine means, transmitting combustion supporting gas, heated by compression and combustion, into said burning loci, and generating and transmitting streams of combustible fuel into said burning loci, each said burning loci substantially receiving at least one of said fuel streams and at least some of said heated gas;

limiting the time duration of the generation of said fuel streams so that at least the majority of fuel in said streams passes into said burning loci during a working stroke of said piston means;

providing a plurality of spaced wall means, with each said wall means peripherally confining and defining a fuel and heated gas agitation zone individually associated with and communicating with a said burning loci;

each said peripherally confined agitation zone and a burning loci associated therewith receiving fuel from at least one fuel stream directed thereinto during said working stroke of said piston means;

prolonging and evening the burning of fuel in said streams by maintaining the existence and a generally discrete relation of said burning loci during said working stroke of said piston means;

utilizing energy generated through operation of said burning loci to induce said working stroke of said piston means;

said spaced wall means defining a plurality of discrete and spaced flow path means operable during said working stroke of said piston means to receive said majority of fuel and maintain separate flows of said fuel leading individually to said burning loci, with each flow separately communicating with a said burning loci;

said plurality of discrete and spaced flow path means including said agitation zones, and defining the location of, and being operable in part to generate, said generally mutually distinct burning loci;

said plurality of flow path means being cyclically operable to receive said streams of fuel and permit the passage of said majority of fuel into said burning loci during working strokes of said piston means, concurrent with the passage of said combustion supporting gas therethrough into said burning loci; and said fuel streams being individually directed so as to pass directly into said flow path means during said working strokes of said piston means, for transmittal directly into said burning loci.

2. A method of effecting combustion in internal combustion engines, as set forth in claim 1 and further comprising:

prior to the generation of said burning loci, initiating a flow of said fuel streams and igniting fringe portions thereof to effect combuston induced heating of said combustion supporting gas.

3. A method of effecting combustion in internal combustion engines as set forth in claim 2, further comprising:

during at least a portion of said working stroke of said piston means, substantially enlarging the flow capacity of said flow path means which in part define said burning loci;

progressively increasing a mass flow rate of combustion supporting gas transmitted to said burning loci and passing into said flow path means during said working stroke of said piston means as said flow path means generally enlarge their flow capacity; and at least during said working stroke of said piston means, progressively increasing a mass rate of flow of combustible fuel passing into said flow path means as said flow capacity of said flow path means progressively increases and said mass rate of flow of combustion supporting gas into said flow path means progressively increases, with said progressive increase in mass flow rate of combustible fuel continuing for at least a majority of the duration of the time during which said fuel passes into said flow path means.

4. A method of effecting combustion in internal combustion engines as set forth in claim 1, further comprising:

during at least a portion of said working stroke of said piston means, substantially enlarging the flow capacity of said flow path means which impart define said burning loci;

progressively increasing a mass flow rate of combustion supporting gas transmitted to said burning loci and passing into said flow path means during said working stroke of said piston means as said flow path means generally enlarge their flow capacity; and at least during said working stroke of said piston means, progressively increasing a mass rate of flow of combustible fuel passing into said flow path means as said flow capacity of said flow path means progressively increases and said mass rate of flow of combustion supporting gas into said flow path means progressively increases, with said progressive increase in mass flow rate of combustible fuel continuing for at least a majority of the duration of the time during which said fuel passes into said flow path means.

5. A method of effecting combustion in internal combustion engines as described in claim 4 further comprising:

defining said flow path means by cooperating wall surfaces of said spaced wall means which are carried in part by said piston means and in part by said cylinder means.

6. A method of effecting combustion in internal combustion engines as defined in claim 4 further comprising:

defining said flow path means by wall surfaces of said spaced wall means which are carried in their entirety by one of said piston means and said cylinder means.

7. A method of effecting combustion in internal combustion engines as described in claim 4, further comprising:

defining said flow path means by wall surfaces of said spaced wall means which extend generally parallel with the axis of reciprocation of said piston means, with said wall surfaces being operable to define an orientation of said flow paths extending generally parallel to said axis of piston means reciprocation.

8. Apparatus for effecting combustion in internal combustion engines, said apparatus comprising:

means operable to generate within engine means, and in energy communicating relation with piston means movable in cylinder means of said engine means, a plurality of generally mutually distinct burning loci, with said burning loci defining generally spaced centers of burning;

means operable during a working stroke of said piston means of said engine means to concurrently
- transmit combustion supporting gas, heated by compression and combustion, into said burning loci, and
- generate and transmit streams of combustible fuel into said burning loci,
- each said burning loci substantially receiving at least one of said fuel streams and at least some of said heating gas;

means for limiting the time duration of the generation of said fuel streams so that at least the majority of fuel in said streams passes into said burning loci during a working stroke of said piston means;

a plurality of spaced wall means, with each such wall means peripherally confining and defining
- a fuel and heated gas agitation zone individually associated with and communicating with a said burning loci;

each said peripherally confined agitation zone and a burning loci associated therewith receiving fuel from at least one fuel stream directed thereinto during said working stroke of said piston means; and means maintaining the existence and a generally discrete relation of said burning loci during said working stroke of said piston means, thereby prolonging and evening the burning of fuel in said streams;

said working stroke of said piston means being induced in response to operation of said burning loci;

said spaced wall means defining a plurality of discrete and spaced flow path means operable during said working stroke of said piston means to receive said majority of fuel and maintain separate flows of said fuel leading individually to said burning loci, with each flow separately communicating with a said burning loci;

said plurality of discrete and spaced flow path means including said agitation zones, and defining the location of, and being operable in part to generate, said generally mutually distinct burning loci;

said plurality of flow path means being cyclically operable to receive said streams of fuel and permit the passage of said majority of fuel into said burning loci during working strokes of said piston means, concurrent with the passage of said combustion supporting gas therethrough into said burning loci; and said fuel streams being individually directed so as to pass directly into said flow path means during said working strokes of said piston means, for transmittal directly into said burning loci.

9. Apparatus for effecting combustion in internal combustion engines as described in claim 8 and further comprising:
means operable, prior to the generation of said burning loci, to initiate a flow of said fuel streams and ignite fringe portions thereof to effect combustion induced heating of said combustion supporting gas.

10. Apparatus for effecting combustion in internal combustion engines as set forth in claim 9, further comprising:
means operable, during at least a portion of said working stroke of said piston means, to substantially enlarge the flow capacity of said flow path means which in part define said burning loci;

means for progressively increasing a mass flow rate of combustion supporting gas transmitted to said burning loci and passing into said flow path means during said working stroke of said piston means as said flow path means generally enlarge their flow capacity; and means operable, at least during said working stroke of said piston means, to progressively increase a mass rate of flow of combustible fuel passing into said flow path means as said flow capacity of said flow path means progressively increases and said mass rate of flow of combustion supporting gas into said flow path means progressively increases, with said progressive increase in mass flow rate of combustible fuel continuing for at least a majority of the duration of the time during which said fuel passes into said flow path means.

11. Apparatus for effecting combustion in internal combustion engines as set forth in claim 8, further comprising:
means operable, during at least a portion of said working stroke of said piston means, to substantially enlarge the flow capacity of said flow path means which in part define said burning loci;

means for progressively increasing a mass flow rate of combustion supporting gas transmitted to said burning loci and passing into said flow path means during said working stroke of said piston means as said flow path means generally enlarge their flow capacity; and means operable, at least during said working stroke of said piston means, to progressively increase a mass rate of flow of combustible fuel passing into said flow path means as said flow capacity of said flow path means progressively increases and said mass rate of flow of combustion supporting gas into said flow path means progressively increases, with said progressive increase in mass flow rate of combustible fuel continuing for at least a majority of the duration of the time during which said fuel passes into said flow path means.

12. Apparatus for effecting combustion in internal combustion engines as described in claim 11, further comprising:
cooperating wall surfaces which comprise said spaced wall means and are carried in part by said piston means and in part by said cylinder means and define said flow path means.

13. Apparatus for effecting combustion in internal combustion engines as defined in claim 11, further comprising:
wall surfaces which comprise said spaced wall means and are carried in their entirety by one of said piston means and said cylinder means and define said flow path means.

14. Apparatus for effecting combustion in internal combustion engines as described in claim 11, further comprising:
wall surfaces which comprise said spaced wall means and extend generally parallel with the axis of reciprocation of said piston means;

said wall surfaces being operable to define said flow path means and an orientation of said flow path means extending generally parallel to said axis of piston means reciprocation.

15. A method of reducing the generation of noxious oxides of nitrogen while effecting combustion in internal combustion engines, said method comprising:

generating, within engine means, and in energy communicating relation with piston means movable in cylinder means of said engine means, a plurality of generally mutually distinct burning loci, with said burning loci defining generally spaced centers of burning;

concurrently, and during a working stroke of said piston means of said engine means, transmitting combustion supporting gas, heated by compression and combustion, into said burning loci, and each said burning loci substantially receiving at least one of said fuel streams and at least some of said heated gas;

causing burning of fuel to extend from said loci, generally transversely and outwardly of an axis of reciprocation of said piston means, and between opposed surface means of said piston means and cylinder head means of said cylinder means;

limiting the time duration of the generation of said fuel streams so that at least the majority of fuel in said streams passes into said burning loci during a working stroke of said piston means;

providing a plurality of spaced wall means, with each such wall means peripherally confining and defining a fuel and heated gas agitation zone individually associated with and communicating with a said burning loci;

each said periphery confined agitation zone and a burning loci associated therewith receiving fuel from at least one fuel stream directed thereinto during said working stroke of said piston means;

prolonging and evening the burning of fuel in said streams by maintaining the existence and a generally discrete relation of said burning loci during said working stroke of said piston means;

utilizing energy generated through operation of said burning loci to induce said work stroke of said piston means and minimize the operating temperatures of said engine means;

said spaced wall means defining a plurality of discrete and spaced flow path means operable during said working stroke of said piston means to receive said majority of fuel and maintain separate flows of said fuel leading individually to said burning loci, with each flow separately communicating with a said burning loci;

said plurality of discrete and spaced flow path means including said agitation zones, and defining the location of, and being operable in part to generate, said generally mutually distinct burning loci;

said plurality of flow path means being cyclically operable to receive said streams of fuel and permit the passage of said majority of fuel into said burning loci during working strokes of said piston means, concurrent with the passage of said combustion supporting gas therethrough into said burning loci; and said fuel streams being individually directed so as to pass directly into said flow path means during said working strokes of said piston means, for transmittal directly into said burning loci.

16. Apparatus for reducing the generation of noxious oxides of nitrogen while effecting combustion in internal combustion engines, said apparatus comprising:

means operable to generate within engine means, and in energy communicating relation with piston means movable in cylinder means of said engine means, a plurality of generally mutually distinct burning loci, with said burning loci defining generally spaced centers of burning;

means operable during a working stroke of said piston means of said engine means to concurrently transmit combustion supporting gas, heated by compression and combustion, into said burning loci, and generate and transmit streams of combustible fuel into said burning loci, each burning loci substantially receiving at least some of said heated gas;

means of causing burning fuel to extend from said loci, generally transversely and outwardly of an axis of reciprocation of said piston means, and between opposed surface means of said piston means and cylinder head means of said cylinder means;

said plurality of discrete and spaced flow path means including said agitation zones, and defining the location of, and being operable in part to generate, said generally mutually distinct burning loci;

said plurality of flow path means being cyclically operable to receive said streams of fuel and permit the passage of said majority of fuel into said burning loci during working strokes of said piston means, concurrent with the passage of said combustion supporting gas therethrough into said burning loci; and said fuel streams being individually directed so as to pass directly into said flow path means during said working strokes of said piston means, for transmittal directly into said burning loci.

* * * * *

UNITED STATES PATENT OFFICE
CERTIFICATE OF CORRECTION

Patent No. 3,963,001    Dated   June 15, 1976

Inventor(s)  Perry Lester Kruckenberg et al.    Page 1 of 4

It is certified that error appears in the above-identified patent and that said Letters Patent are hereby corrected as shown below:

On the Title Page, at "[75]", on the second line, change "Harld" to -- Harold --.

On the Title Page, after "[73] ... Calif.", insert the following paragraph: -- [*] Notice: The portion of the term of this patent subsequent to December 1, 1987 has been disclaimed. --

Column 2, line 21, before "airstreams" change "Heat" to -- Heated --.

Column 3, line 31, after "characteristics" insert -- of a diesel engine operated so as to provide a variation in fuel injection rate, tending to approach the desirable operating characteristics --.

Column 5, line 56, before "manufacturing" change "more" to -- mere-
Column 6, line 34, after "55" change "fromed" to -- formed -- .
Column 6, line 44, after "threaded" change "study" to -- stud --.

Column 8, line 18, before "purposes" change "evauation" to --evaluation --.
Column 8, line 67, before "of" change "existing" to -- exiting --.
Column 9, line 31, after "open" change "sides" to -- sided --.
Column 9, line 42, after "and" change "the" to -- be --.
Column 9, line 53, after "right" (second occurrence) add -- side --.
Column 10, line 14, after "air" change "interest" to -- insersect --.

Column 10, line 48, after "surface" change "33" to -- 38 -- .
Column 11, line 30, after "operation" change "the" to -- they--.

UNITED STATES PATENT OFFICE
CERTIFICATE OF CORRECTION

Patent No. 3,963,001  Dated June 15, 1976

Inventor(s) Perry Lester Kruckenberg et al.

It is certified that error appears in the above-identified patent and that said Letters Patent are hereby corrected as shown below:

Column 12, line 54, before "an" (first occurrence) change "the" to -- in --.

Column 13, line 57, before "as" change "crease" to -- creases --.

Column 14, line 17, after "interaction" change "beteen" to -- between --.
Column 14, line 35, before "alternately" change "of" to -- or --.
Column 15, line 3, after "orifices" change "or" to -- of --.
Column 16, line 6, after "F." change "coller" to -- cooler --.
Column 16, line 15, after "diesel" change "blocking" to -- knocking --.
Column 16, line 23, before "nature" change "of" to -- or --.

Column 17, line 11, before "and" change "located" to -- generated --.
Column 17, line 45, before "engine" change "quit" to -- quiet --.
Column 17, line 46, change "believe" to -- believed --.
Column 17, line 65, after "disclose" change "line" to -- the --.
Column 19, line 14 (Claim 1) before "wall" change "said" to -- such --.
Column 20, line 19 (Claim 4) after "which" change "impart" to -- in part --.
Column 21, line 10 (Claim 8) after "said" change "heating" to --heated--.
Column 24, line 29 (Claim 16) after "each" insert -- said --.
Column 24, line 31 (Claim 16) after "means" change "of" to -- for --.
Column 24, line 36 (Claim 16) after "means" add the following:

-- means for limiting the time duration of the generation of said fuel streams so that at least the majority of fuel in said streams passes into said burning loci during a working stroke of said piston means;

UNITED STATES PATENT OFFICE
CERTIFICATE OF CORRECTION

Patent No. 3,963,001          Dated June 15, 1976

Inventor(s) Perry Lester Kruckenberg et al.    Page 3 of 4

It is certified that error appears in the above-identified patent and that said Letters Patent are hereby corrected as shown below:

a plurality of spaced wall means, with each such wall means peripherally confining and defining a fuel and heated gas agitation zone individually associated with and communicating with a said burning loci;

each said peripherally confined agitation zone and a burning loci associated therewith receiving fuel from at least one fuel stream directed thereinto during said working stroke of said piston means;

means maintaining the existence and a generally discrete relation of said burning loci during said working stroke of said piston means, thereby prolonging and evening the burning of fuel in said streams;

UNITED STATES PATENT OFFICE
CERTIFICATE OF CORRECTION

Patent No. 3,963,001  Dated June 15, 1976

Inventor(s) Perry Lester Kruckenberg et al.

It is certified that error appears in the above-identified patent and that said Letters Patent are hereby corrected as shown below:

said working stroke of said piston means being induced in response to operation of said burning loci;

said spaced wall means defining a plurality of discrete and spaced flow path means operable during said working stroke of said piston means to receive said majority of fuel and maintain separate flows of said fuel leading individually to said burning loci, with each flow separately communicating with a said burning loci; --.

Signed and Sealed this

Seventh Day of June 1977

[SEAL]

*Attest:*

RUTH C. MASON  
*Attesting Officer*

C. MARSHALL DANN  
*Commissioner of Patents and Trademarks*

UNITED STATES PATENT OFFICE
CERTIFICATE OF CORRECTION

Patent No. 3,963,001     Dated June 15, 1976

Inventor(s) Perry Lester Kruckenberg et al.

It is certified that error appears in the above-identified patent and that said Letters Patent are hereby corrected as shown below:

Column 2, line 40, after "loci" change "will to -- may--.

Column 3, line 38, after "Fig." change "15" to -- 14 --.

Column 5, line 17, after "the" (first occurrence) change "point" to -- pointed --.

Column 6, line 66, after "plane" change "laterally" to -- generally --.

Column 10, line 43, after "this" change "phenomena" to -- phenomenon --.

Column 11, line 38, after "center" add a quotation mark (").

Column 16, line 58, after "precise" change "phenomena" to -- phenomenon --.

UNITED STATES PATENT OFFICE
CERTIFICATE OF CORRECTION

Patent No. 3,963,001            Dated June 15, 1976

Inventor(s) Perry Lester Kruckenberg etal.

It is certified that error appears in the above-identified patent and that said Letters Patent are hereby corrected as shown below:

Column 17, line 11, before "and" change "located"

to -- generated --.

Signed and Sealed this

Sixth Day of September 1977

[SEAL]

*Attest:*

RUTH C. MASON          LUTRELLE F. PARKER
*Attesting Officer*      *Acting Commissioner of Patents and Trademarks*